US009001921B1

(12) United States Patent
He et al.

(10) Patent No.: US 9,001,921 B1
(45) Date of Patent: Apr. 7, 2015

(54) CIRCUITS, ARCHITECTURES, METHODS, ALGORITHMS, SOFTWARE, AND SYSTEMS FOR IMPROVING THE RELIABILITY OF DATA COMMUNICATIONS HAVING TIME-DEPENDENT FLUCTUATIONS

(71) Applicant: Marvell International Ltd., Hamilton (BM)

(72) Inventors: Runsheng He, Sunnyvale, CA (US); Zhan Yu, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/861,964

(22) Filed: Apr. 12, 2013

Related U.S. Application Data

(63) Continuation of application No. 10/782,059, filed on Feb. 18, 2004, now abandoned.

(51) Int. Cl.
  *H04B 15/00* (2006.01)
  *H04B 3/54* (2006.01)
  *H04L 1/00* (2006.01)

(52) U.S. Cl.
  CPC ............... *H04L 1/0042* (2013.01); *H04B 3/54* (2013.01)

(58) Field of Classification Search
  CPC ............... H04L 1/08; H04B 3/00; H04B 3/54
  USPC ......... 375/316, 340, 341, 130, 140, 147, 259, 375/285
  See application file for complete search history.

(56) References Cited

U.S. PATENT DOCUMENTS

| | | | |
|---|---|---|---|
| 4,864,589 | A | 9/1989 | Endo |
| 5,034,882 | A | 7/1991 | Eisenhard et al. |
| 5,189,683 | A | 2/1993 | Cowart |
| 5,241,283 | A | 8/1993 | Sutterlin |
| 5,357,541 | A | 10/1994 | Cowart |
| 5,404,127 | A | 4/1995 | Lee et al. |
| 5,424,710 | A | 6/1995 | Baumann |
| 5,475,687 | A | 12/1995 | Markkula, Jr. et al. |
| 5,485,040 | A | 1/1996 | Sutterlin |
| 5,687,257 | A | 11/1997 | Paik et al. |
| 5,703,766 | A | 12/1997 | Sutterlin et al. |
| 5,812,557 | A | 9/1998 | Stewart et al. |
| 5,844,888 | A | 12/1998 | Markkula, Jr. et al. |
| 5,911,119 | A | 6/1999 | Bartholomew et al. |

(Continued)

FOREIGN PATENT DOCUMENTS

| | | |
|---|---|---|
| EP | 0963058 A2 | 12/1999 |
| EP | 1179909 A2 | 2/2002 |

(Continued)

*Primary Examiner* — Kevin M Burd

(57) ABSTRACT

Circuits, architectures, methods, algorithms, software, and systems for increasing reliability of data communications using time diversity coding are disclosed. An association circuit is configured to associate a first reliability factor with a first copy of the communicated data and a second reliability factor with a second copy of the communicated data, wherein the first reliability factor is different from the second reliability factor and has a value that is a predetermined function of a known characteristic of the data communications channel at a time that the communicated data passed through the channel. A decoder is configured to recover a reliable value for the communicated data from the first copy, second copy, first reliability factor, and second reliability factor.

23 Claims, 3 Drawing Sheets

(56) References Cited

U.S. PATENT DOCUMENTS

| | | |
|---|---|---|
| 5,949,327 A | 9/1999 | Brown |
| 6,144,292 A | 11/2000 | Brown |
| 6,157,292 A | 12/2000 | Piercy et al. |
| 6,194,996 B1 | 2/2001 | Okazaki et al. |
| 6,232,910 B1 | 5/2001 | Bell et al. |
| 6,239,722 B1 | 5/2001 | Colton et al. |
| 6,243,413 B1 | 6/2001 | Beukema |
| 6,246,325 B1 | 6/2001 | Chittipeddi |
| 6,246,868 B1 | 6/2001 | Bullock et al. |
| 6,282,405 B1 | 8/2001 | Brown |
| 6,313,738 B1 | 11/2001 | Wynn |
| 6,324,159 B1 | 11/2001 | Mennekens et al. |
| 6,370,396 B1 | 4/2002 | Meiksin et al. |
| 6,388,564 B1 | 5/2002 | Piercy et al. |
| 6,392,572 B1 * | 5/2002 | Shiu et al. .................. 341/81 |
| 6,397,368 B1 * | 5/2002 | Yonge, III et al. ............ 714/792 |
| 6,400,308 B1 | 6/2002 | Bell et al. |
| 6,404,773 B1 | 6/2002 | Williams et al. |
| 6,581,179 B1 | 6/2003 | Hassan |
| 6,701,468 B1 * | 3/2004 | Yamazaki et al. ............ 714/702 |
| 2002/0016180 A1 | 2/2002 | Derosier et al. |
| 2004/0037251 A1 * | 2/2004 | Shneyour et al. ............. 370/336 |
| 2004/0037311 A1 * | 2/2004 | Willes et al. ................. 370/465 |
| 2004/0116143 A1 * | 6/2004 | Love et al. .................... 455/522 |
| 2004/0165552 A1 | 8/2004 | Kim |

FOREIGN PATENT DOCUMENTS

| | | |
|---|---|---|
| JP | 2002111554 A | 4/2002 |
| WO | WO-9948218 A1 | 9/1999 |
| WO | WO-0010264 A1 | 2/2000 |
| WO | WO-0103315 A1 | 1/2001 |
| WO | WO-0128215 A1 | 4/2001 |
| WO | WO-0182581 A1 | 11/2001 |
| WO | WO-0209301 | 1/2002 |

* cited by examiner

CIRCUITS, ARCHITECTURES, METHODS, ALGORITHMS, SOFTWARE, AND SYSTEMS FOR IMPROVING THE RELIABILITY OF DATA COMMUNICATIONS HAVING TIME-DEPENDENT FLUCTUATIONS

CROSS-REFERENCE TO RELATED APPLICATION

This application is a continuation of U.S. application Ser. No. 10/782,059 filed Feb. 18, 2004, which is incorporated by reference herein in its entirety.

FIELD OF THE INVENTION

The present invention generally relates to the field of data communications. More specifically, embodiments of the present invention pertain to circuits, architectures, methods, algorithms, software, and systems for data communications that have time-dependant fluctuations.

DISCUSSION OF THE BACKGROUND

Data communications systems or networks generally comprise channels for sending and receiving data. A number of wired communications systems or networks, such as cable, Ethernet and Gigabit Ethernet systems, generally include stationary channels. A stationary channel is generally one in which the channel response and the noise statistics do not vary significantly or regularly (if at all) over time. Techniques are available for such systems and networks to reduce the adverse effects of fluctuations in communications parameters. However, such techniques generally do not affect communications parameters that tend to fluctuate over time.

Certain communications systems or networks, such as powerline systems or networks, include cyclostationary channels. A cyclostationary channel is one in which the channel response, the noise statistics and/or channel attenuation vary periodically. Also, powerline channels, which use conventional AC power lines for communications, experience regular fluctuations in noise and signal attenuation. The period of the noise power function in a powerline channel is generally the inverse of its frequency. In a typical case, that period is (1/120 Hz), or 8.3 msec. Noise in a powerline channel may also be introduced by other sources (such as a zero sequence current), some of which may be periodic (e.g., harmonics such as a third harmonic). During "spikes" in the noise power in a powerline channel, the signal-to-noise ratio (SNR) can be reduced sufficiently to cause errors in the data. Particularly when the signal strength is low, a low SNR can cause significant reliability problems.

A need therefore exists to increase the reliability of data communicated in channel in which time-dependant fluctuations are a potential source of error, to reduce errors and/or shutdowns in networks that include such cyclostationary channels.

SUMMARY OF THE INVENTION

Embodiments of the present invention relate to circuitry, architectures, methods, algorithms, software, and systems for improving reliability of data communications having time-dependant processing fluctuations by using time diversity coding. The circuitry and/or architecture generally comprises (1) an encoder configured to generate a plurality of copies of the communicated data; (2) an association circuit configured to associate a reliability factor with each copy of the communicated data, where the reliability factor has a value that is a function of a data communications parameter; and (3) a decoder configured to generate a reliable value for the communicated data from the plurality of copies of the communicated data and the associated reliability factors. The method and/or algorithm generally comprise the steps of (a) reading a plurality of copies of the communicated data over a predetermined period of time; (b) associating each copy of the communicated data with a reliability factor, the reliability factor having a value that is a function of a time-dependent parameter associated with transmitting the communicated data; and (c) recovering a reliable value for the communicated data. The software is generally configured to implement one or more aspects of the inventive methods and/or algorithms disclosed herein. The systems generally comprise those that include a circuit embodying one or more of the inventive concepts disclosed herein.

The present invention advantageously provides improved reliability in data communications. The present invention is particularly useful in cyclostationary channels, such as powerline channels, where certain parameters have time-dependent or periodic variations in value. Intelligent time diversity coding can ensure that at least one copy of communicated data is received and/or processed during a time period when the associated reliability factor has a relatively high value. These and other advantages of the present invention will become readily apparent from the detailed description of preferred embodiments below.

DETAILED DESCRIPTION OF THE PREFERRED EMBODIMENTS

Figure 1:
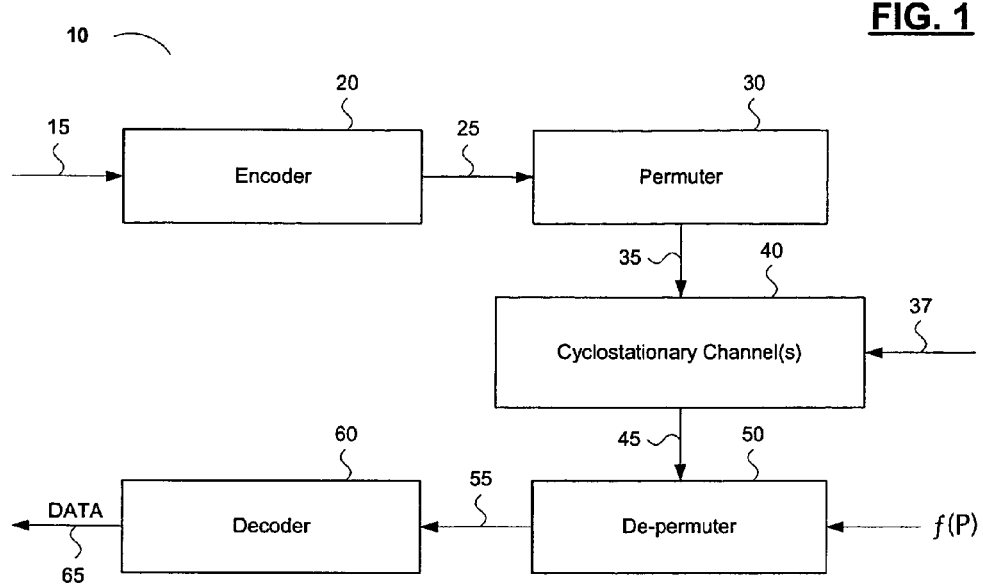
FIG. 1 is a box-level diagram showing an embodiment of the present time diversity coding architecture.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or data processing system, or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (any of which may be direct or indirect), but these terms are also generally given their art-recognized meanings.

The present invention concerns a circuit and/or architecture for increasing reliability of data communications in cyclostationary channels. The circuit generally comprises (1) an encoder configured to generate a plurality of copies of the communicated data; (2) an association circuit configured to associate a reliability factor with each copy of the communicated data where the reliability factor has a value that is a function of a data communications parameter; and 3) a decoder configured to generate a reliable value for the communicated data from the plurality of copies of the communicated data and the associated reliability factors.

A further aspect of the invention concerns methods, algorithms and software for increasing reliability of data communications in cyclostationary channels (e.g., that have time-dependant processing and/or parameter fluctuations). The method generally comprises the steps of (a) reading a plurality of copies of the communicated data over a predetermined period of time; (b) associating each copy of the communicated data with a reliability factor, the reliability factor having a value that is a function of a data communications parameter; and (c) generating a reliable value for the communicated data from the copies of the communicated data and the associated reliability factors. The algorithm generally reflects the flow of the method steps, and the software is generally configured to implement one or more aspects of the inventive methods and/or algorithms disclosed herein.

An even further aspect of the invention concerns a system and network, generally comprising the present circuit and/or embodying one or more of the inventive concepts described herein. The invention, in its various aspects, will be explained in greater detail below with regard to exemplary embodiments.

Exemplary Circuits and Architectures

In one aspect, the present invention relates to a circuit, comprising an encoder configured to generate a plurality of copies of the communicated data, an association circuit configured to associate a reliability factor based on a data communications parameter with each copy of the communicated data, and a decoder configured to generate a reliable value for the communicated data from the plurality of copies of the communicated data and the associated reliability factors. In one embodiment, the data communications parameter is a time-dependent data communications parameter (e.g., a parameter the value of which varies or fluctuates as a function of time). In various further embodiments, the copies of the communicated data are sequentially output by the encoder in the same time period in which the original communicated data was received by the circuit, and/or the second circuit associates each bit (or group of bits) in the sequentially output copies with the reliability factor, and/or the reliability factor has a value that is a function of a time-dependent parameter of a channel through which the communicated data were passed.

Thus, in various embodiments of the present circuit, the communicated data is communicated at a predetermined rate, and the first circuit generates the plurality of copies of the communicated data at the predetermined rate. Furthermore, the data communicated in a time period defined by the predetermined rate may further define a block of communicated data, and as will be described in greater detail below, the circuit may further comprise a permuter configured to output each of the copies of communicated data sequentially in the time period defined by the predetermined rate of data communication.

FIG. 1 shows a first exemplary time diversity encoding channel architecture 10, including an encoder 20, a permuter 30, a cyclostationary channel 40, a de-permuter 50 and a decoder 60. Communicated data is received by encoder 20 from serial bus 15, and thus, the term "user data" may refer herein to communicated data that has been received by circuitry associated with a cyclostationary channel. The user data passes through circuit 10 in various forms (to be described in more detail with respect to FIG. 2) along the path defined by busses 25, 35, 45, and 55. The data generated in accordance with associated reliability factors DATA is output from decoder 60 on bus 65. The output data signal DATA may be serial or parallel, depending on design and/or application criteria.

Encoder 20 is generally conventional, and is generally configured to generate or create multiple copies of the user data that it receives, which may be output in parallel on bus 25. Generally, the width of bus 25 equals the number of copies of user data. Permuter 30 is generally configured to arrange or select a sequence for the copies of the user data. Cyclostationary channel 40 is also largely conventional, and generally has a characteristic channel response. Thus, channel 40 has or includes a number of parameters that have fixed or variable values, including one or more parameters (such as noise, power and/or attenuation) that may have a time-dependant value. Any modifications that may be useful, desired and/or necessary to adapt a conventional cyclostationary channel 40 for use with the present invention will be readily apparent to those skilled in the art.

De-permuter 50 is configured to (i) perform the inverse or reverse function of permuter 30 (e.g., rearrange the data to its location as output from encoder 20) and (ii) associate (e.g., add or mathematically apply) the reliability factor with each copy of the communicated data, either bitwise (e.g., each bit in each copy receives an associated reliability factor) or groupwise (e.g., a group or sequence of bits receives a common associated reliability factor). In one embodiment, de-permuter 50 associates the sequentially output copies of communicated data with a real-time reliability factor; that is, each bit (or group or sequence of bits) receives the reliability factor that corresponds to the time-dependent value of the channel parameter as that bit (or group or sequence) passed through the channel. Thus, de-permuter 50 may further receive a time-dependent channel parameter value input, which may comprise the parameter value itself, or the reliability factor corresponding to the parameter value. Furthermore, de-permuter 50 may be further configured to align the reliability factor with a corresponding copy of the communicated data (e.g., at a particular location, bit, or group or sequence of bits).

Decoder 60 is generally conventional, and is generally configured to recover a reliable value for the communicated data, from the plurality of user data copies and the associated reliability factors received from de-permuter 50 on bus 55. Generally, decoder 60 generates a decision metric based on the user data copies and their associated reliability factors. Thus, the present circuit is adapted for use with analog data and/or waveforms. However, in the digital case, decoder 60 may select or accept the most reliable copy of the user data according to the associated reliability factors (i.e., by selecting a copy of the user data having a highest reliability factor for subsequent use and/or processing). Decoder 60 may therefore include, for example, a comparator that determines which reliability factor associated with a given bit, group of bits or bit sequence from among the plurality of copies of communicated data has the highest value. If more than one bit, group or sequence has the highest associated reliability factor (i.e., their associated reliability factors have the same value), then any such bit, group or sequence may be selected. For example, in one embodiment when more than one bit, group or sequence has the highest associated reliability factor, the selected bit, group or sequence is from the same copy of the communicated data as that of the most recently selected bit, group or sequence.

Figure 2:
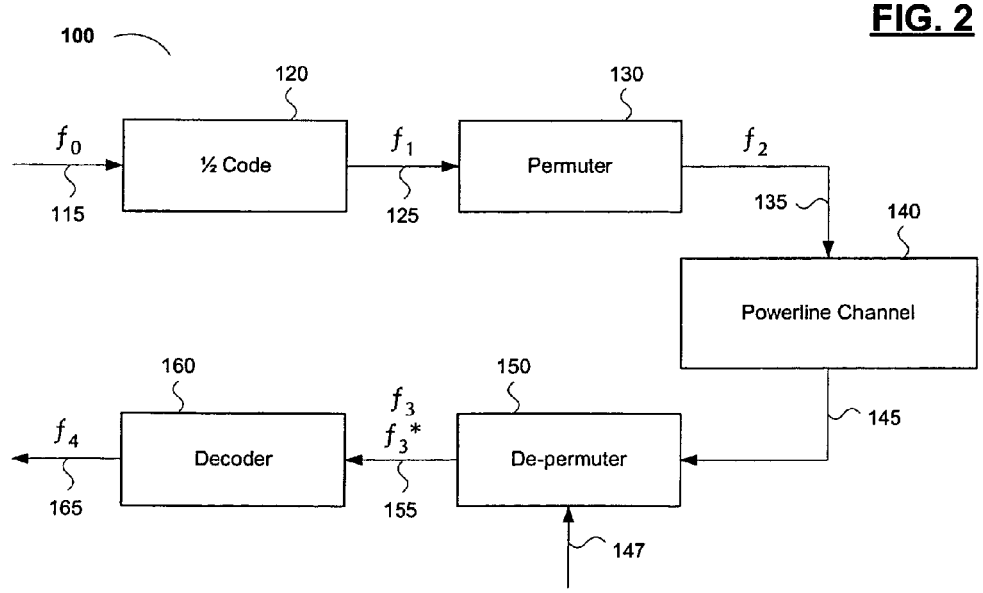
FIG. 2 is a box-level diagram showing a second embodiment of the present time diversity coding architecture.
Figure 3:
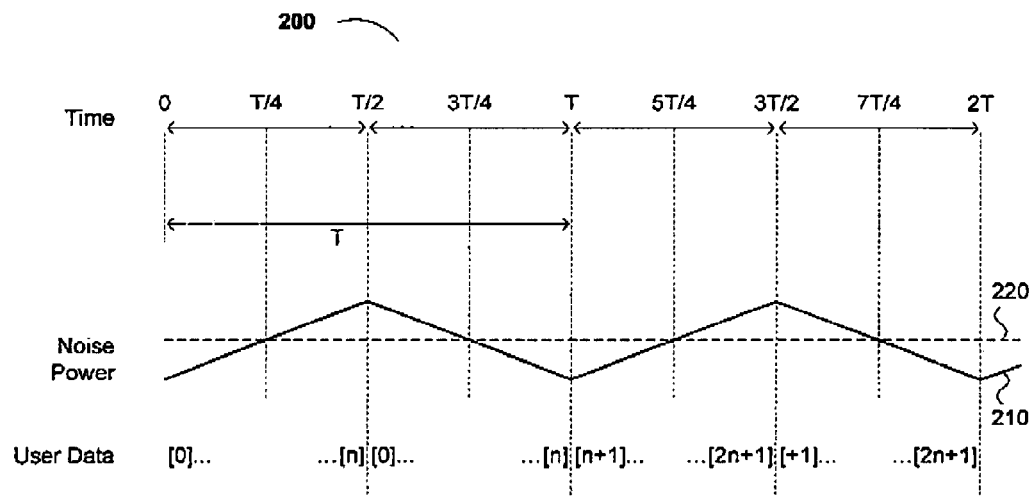
FIG. 3 is a diagram showing operation of the present invention, using various exemplary waveforms.

The operation of the present circuit and/or architecture will be explained with respect to FIGS. 2 and 3. FIG. 2 shows a more specific time diversity encoding channel architecture 100, comprising half-coder 120, permuter 130, powerline channel 140, de-permuter 150 and decoder 160. A block of communicated data $f_0$ is received by half-coder 120 on serial bus 115. Data block $f_0$ may be represented by the following equation:

$$f_0 = a_0, a_1, a_2, \ldots a_{n-1}, a_n \quad (1)$$

where $a_0$ through $a_n$ is the sequence of data bits received by half-coder 120 during the period of the time-dependent channel parameter variation or fluctuation. Half-coder 120 effectively creates a copy of each bit in the sequence, in the same time-space (or bit length) as the original bit. Mathematically, half-coder 120 creates a data pattern $f_1$, which may be represented by the following equations:

$$f_1 = b_0, b_1, b_2, \ldots b_{n-1}, b_n, b_{n+1}, \ldots b_{2n-1}, b_{2n}, b_{2n+1} \quad (2)$$

$$b_0 = b_1 = a_0,\ b_2 = b_3 = a_1,\ b_n = b_{n+1} = a_{n/2},\ b_{2n} = b_{2n+1} = a_n \quad (3)$$

It is well within the abilities of one skilled in the art to design and use logic configured to create copies of each bit in a data sequence, in the same time-space (or bit length or bit period) as the original bit. An exemplary encoder circuit for performing such a function is described in greater detail below.

Permuter 130 is configured to rearrange the sequence of data pattern $f_1$. In the example of FIG. 2, permuter 130 outputs a data sequence $f_2$, which may be represented by the following equations:

$$f_2 = c_0, c_1, c_2, \ldots c_{n-1}, c_n, c_{n+1}, \ldots c_{2n-1}, c_{2n}, c_{2n+1} \quad (4)$$

$$c_0 = b_0,\ c_1 = b_2, \ldots c_{n-1} = b_{2n-2},\ c_n = b_{2n},\ c_{n+1} = b_1,$$
$$c_{n+2} = b_3, \ldots c_{2n} = b_{2n-1},\ c_{2n+1} = b_{2n+1} \quad (5)$$

The data sequence $f_2$ then passes through powerline channel 140 in accordance with its characteristic channel response. However, powerline channels are generally cyclostationary, and as a result, have certain time-dependent parameter variations. For example, the noise power in a powerline channel varies periodically. Referring now to FIG. 3, in a typical powerline application, the noise power curve 210 varies with a frequency of about 120 Hz; thus, the noise power fluctuations have a period T of about 8.3 msec. During a parameter fluctuation period T, one block of user data bits 0:n may be received, but two copies of data bits 0:n are sent through channel 140 (one copy during each successive half-period 0–T/2 and T/2–T). In the example shown in FIG. 3, the noise power values are unacceptably high about half the time. Given the approximately linear rise and fall of the noise power variations, one can set a predetermined reliability threshold for the noise power parameter at about the midpoint (or average value) 220 of the overall noise power curve 210. In the analog case, the reliability factors associated with data below the threshold will be higher than the reliability factors associated with data above the threshold. However, the exact relationship between the value of the reliability factor and the value of the time-dependant parameter may be linear, exponential, logarithmic, or a combination thereof, depending on application and/or design criteria and reliability factor/parameter value granularity.

In the example of FIG. 2, where permuter 130 receives a half-coded sequence, permuter 130 passes the first and second copies of the data through channel 140 at different portions of the channel parameter fluctuation period. Thus, where the channel parameter fluctuation period is known, the permuter function can be derived and implemented deterministically. However, where the channel parameter fluctuation is random, the permuter function should be derived and implemented somewhat probabilistically (e.g., each of the multiple copies of data may be rearranged randomly). In the probabilistic approach, it may be advantageous to generate and use more than two copies of data (e.g., 4 or more copies) to increase the reliability of the data to a greater degree.

Referring back to FIG. 2, de-permuter 150 receives data sequence $f_2$ from powerline channel 140 on serial bus 145, along with concurrent reliability factor and/or time-dependent parameter value information on bus 147. As described in part above, reliability factor and/or time-dependent parameter value information may comprise an analog or multibit digital signal representing the actual parameter value at the time data sequence $f_2$ was passing through powerline channel 140. Such actual values and/or information (a graph of which may be considered to be a "time diversity parameter function") are known a priori at the time of processing the communicated data, although it may vary from device to device, from channel to channel and/or from network to network.

Alternatively, time-dependent parameter value information may comprise a single bit digital signal representing whether the actual parameter value was above or below the predetermined threshold value (e.g., noise power vale 220 in FIG. 3) at the time data sequence $f_2$ was being filtered in powerline channel 140 or received in the device including powerline channel 140.

De-permuter 150 associates a reliability factor with each copy of the transmitted data, either bit-by-bit or in series, sequences or groups of bits. The reliability factor is based on a data communications or transmission parameter that may have time-dependant variations, as described above. Mathematically, de-permuter 150 converts data sequence $f_2$ into an associated series of two bit sequences $f_3$ and $f_3^*$, which generally involves the inverse operation performed by permuter 130:

$$f_3 = b'_0, b'_1, b'_2, \ldots b'_{n-1}, b'_n, b'_{n+1}, \ldots b'_{2n-1}, b'_{2n}, b'_{2n+1} \quad (6)$$

$$f_{3*} = \beta_0, \beta_1, \beta_2, \ldots \beta_{n-1}, \beta_n, \beta_{n+1}, \ldots \beta_{2n-1}, \beta_{2n}, \beta_{2n+1} \quad (7)$$

where $b'_0$ through $b'_{2n+1}$ is the data sequence transmitted through channel 140 (corresponding to data sequence $f_1$, but which may be corrupted by noise or other channel parameter [s] having fluctuating values), and $\beta_0$ through $\beta_{2n+1}$ are the reliability factors associated with each of bits $b'_0$ through $b'_{2n+1}$, respectively.

Decoder 160 is configured to (i) weight the different bits corresponding to a given place in the data sequence according to their associated reliability factors and (ii) recover or generate a reliable value for the originally-communicated data from the data transmitted through cyclostationary channel 140 and the associated reliability factors. In a relatively simple digital approach, the reliability factors are assigned a digital value (i.e., 1 or 0), depending on whether the time-dependent data processing parameter value is above or below the predetermined threshold. The digital scheme works particularly well in certain embodiments described herein in which the percentage of time that the reliability factor is above or below the threshold matches the data coding factor in half-coder 120 (i.e., both are half), and/or the time periods for the time diversity coded sequences (e.g., the data pattern defined by equations (4) and (5) above) match the time periods during which the reliability factor is above or below the threshold (i.e., both are T/2; see FIG. 3). However, integer multiples or divisors of the coding factors and/or time periods also work (e.g., quarter-coding, or creating four copies of the communicated data, works for a parameter value curve that is periodically 25% above the threshold and 75% below; one-sixth coding works for a parameter value curve that is periodically 16.7% above the threshold and 83.3% below; etc.), as long as the coding factor ensures that at least one copy of each data bit has a corresponding reliability factor indicating that the time-dependant parameter is below the predetermined threshold.

Alternatively, in the analog case, the reliability factors can be assigned an analog value, depending on or correlated to the actual value of the time-dependent data processing parameter. When $f_3$ analog data are sampled in accordance with conventional techniques, the sampled data received and/or stored in decoder 160 are then multiplied by their associated reliability factors and summed to generate a decision metric for the originally communicated data. When $f_3$ represents analog data and/or an analog waveform, the data are generally multi-bit values. The analog approach, in which a decision metric is generated from the received samples and the associated reliability factors, is a more general solution than the digital approach, which selects a reliable data value from a copy of the sample having the highest associated reliability factor.

In the general (analog) case, logic circuitry in decoder 160 generates a reliable value for a data bit in a data sequence transmitted through a cyclostationary channel 140 by performing mathematical operations (e.g., a function $f_4$) on bit sequences $f_3$ and $f_3^*$ (see, e.g., equations (6) and (7) above) as follows:

$$f_4 = (Y_1 \cdot R_1) + (Y_2 \cdot R_2) \quad (8)$$

where $Y_1$ is the sample corresponding to the first copy of data received from powerline channel 140, $Y_2$ is the sample corresponding to the second copy of this data, $R_1$ is the associated reliability factor for $Y_1$, and $R_2$ is the associated reliability factor for $Y_2$. For example, if $Y_1 = b'_0$ in data sequence $f_3$, then $Y_2 = f_3(b'_1)$, $R_1 = f_3^*(\beta_0)$, and $R_2 = f_3(\beta_1)$. Therefore, the following equation for $f_a$ may be obtained from equations (6) and (7):

$$f_4 = (Y_1 \cdot R_1) + (Y_2 \cdot R_2) = (f_3(b'_0) \cdot f_3^*(\beta_0)) + (f_3(b'_1) \cdot f_3^*(\beta_1)) \quad (10)$$

The value of the data at a given position in the data sequence $f_4$ is determined in accordance with a decision metric (in this case, the result calculated by the summation of $Y_1 \cdot R_1$ and $Y_2 \cdot R_2$). If the decision metric calculated by decoder 160 is less than zero, then the data output by decoder 160 is assigned a digital value of negative one (−1). If the decision metric calculated by decoder 160 is greater than zero, then the data output by decoder 160 is assigned a digital value of positive one (1). Generally, decoder 160 will calculate a decision metric of greater than or less than zero for $f_4$. In the case where the decision metric calculated by decoder 160 is equal to zero (that is, $f_4 = 0$), the decoder logic will detect such an occurrence and can output either digital data value (i.e., either 1 or −1). In one embodiment, the decoder logic generates an output value of (1) when $f_4 = 0$. Of course, it is well within the abilities of one skilled in the art to devise a similar approach in a system using different digital data values (e.g., 1 and 0).

For example, assume the following values:

$$Y_1 = 0.5, R_1 = 0.9$$

$$Y_2 = -0.8, R_2 = -0.1$$

The output value generated by the logic circuitry for $f_4$ would be 1, since $f_4 = (Y_1 \cdot R_1) + (Y_2 \cdot R_2) = (0.5 \cdot 0.9) + (-0.8 \cdot 0.1) = 0.37$, which is greater than zero. Therefore, the output data decision is 1, in accordance with the decision metric described above.

The time-dependent parameters for which time diversity coding are applicable include noise parameters (such as harmonic noise of nearly any kind, and in nearly any kind of channel), power parameters (such as signal modulation, channel attenuation and/or power factor control parameters), and others (such as zero sequence current). Thus, the time-dependent parameter in the present invention is not limited to noise power in a powerline channel.

Exemplary Encoder-Permuter Circuitry

Figure 4:
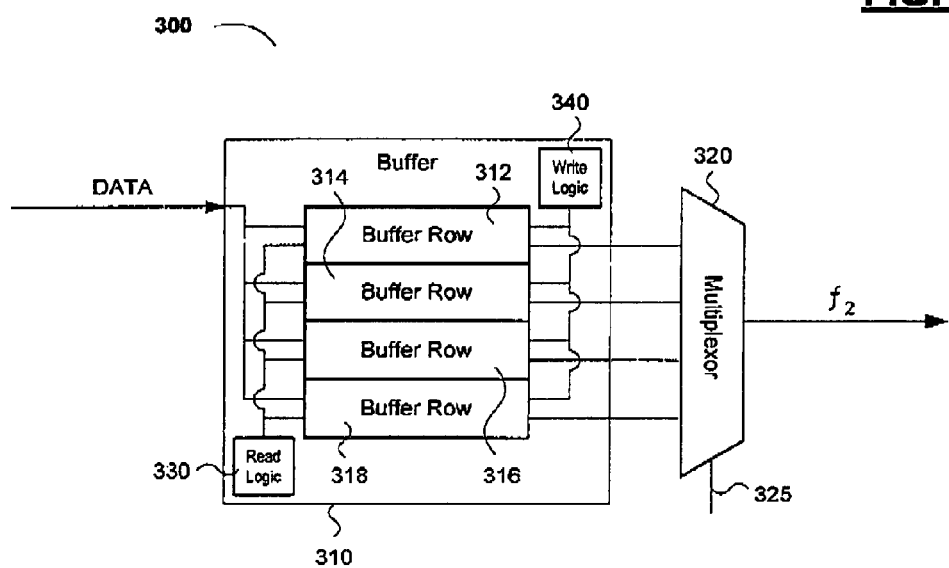
FIG. 4 is a diagram showing an embodiment of the present encoder-permuter.

In one embodiment, the present time diversity coding architecture comprises encoder and permuter circuitry. FIG. 4 shows exemplary encoder and permuter circuitry 300 suitable for the present invention, comprising buffer 310 and multiplexer 320. Buffer 310 generally comprises buffer rows 312, 314, 316 and 318, each configured to receive communicated data stream DATA (generally in response to a signal from write pointer logic 330) and output a copy of communicated data stream DATA (generally in response to a signal from read pointer logic 340) to multiplexer 320 on read busses 342, 344, 346 and 348, respectively. Time coded data pattern $f_2$ is output by multiplexer 320 in response to a control signal 325. In the example of FIG. 4, control signal 325 is a multibit signal.

The operation of the exemplary encoder and permuter circuitry 300 is as follows. Communicated data stream DATA is simultaneously written into as many buffer rows 312-318 as there will be copies of the communicated data. In the case of half-coding, communicated data stream DATA is simultaneously written into buffer rows 312 and 314, in response to appropriate signals from write pointer 330. Buffer rows 312-318 may comprise conventional SRAM rows (in which case buffer 310 comprises an array of SRAM elements [e.g., arranged in conventional rows and columns]), rows of conventional flip-flops or latches, or registers (e.g., conventional shift registers). Write pointer logic 330 is conventional, and it is well within the abilities of one skilled in the art to design and implement pointer logic that performs the functions described herein for write pointer 330.

Thereafter, the copy of communicated data stored in row 312 is read out in response to appropriate states of control signals (i) from read pointer 340 (which may designate the column location, and optionally the row, of buffer 310 from which to read a copy of the data) and (2) in multiplexer 320, which in response to appropriate states of control signal 325, selects a different buffer row for a permuter output at a time $m*(T/q)$, where m is an integer and q is the number of copies of communicated data (i.e., the time diversity coding factor). In the example of FIG. 4, q is 2, and control signal 325 may be generated by a one-bit incrementer that changes state every T/2 msec (in turn, in response to an appropriately configured counter receiving a real-time clock signal). Read pointer logic 330 and multiplexer 320 are conventional, and it is well within the level of skill in the art to design and implement pointer logic and multiplexer control logic that perform(s) the functions described herein for read pointer 330 and multiplexer 320, respectively.

While the number of rows in buffer 310 may be as few as the number of copies of communicated data being made, buffer 310 comprises a number of rows that is an integer multiple of the number of copies of communicated data being made (in this case, twice as many rows as copies). In this configuration, one can write to rows 316 and 318 while reading from rows 312 and 314, and vice versa, thereby minimizing latency in buffer 310. Thus, the present circuit may comprise a buffer having at least two rows for each copy of the communicated data.

Exemplary Decoder Circuitry

Figure 5:
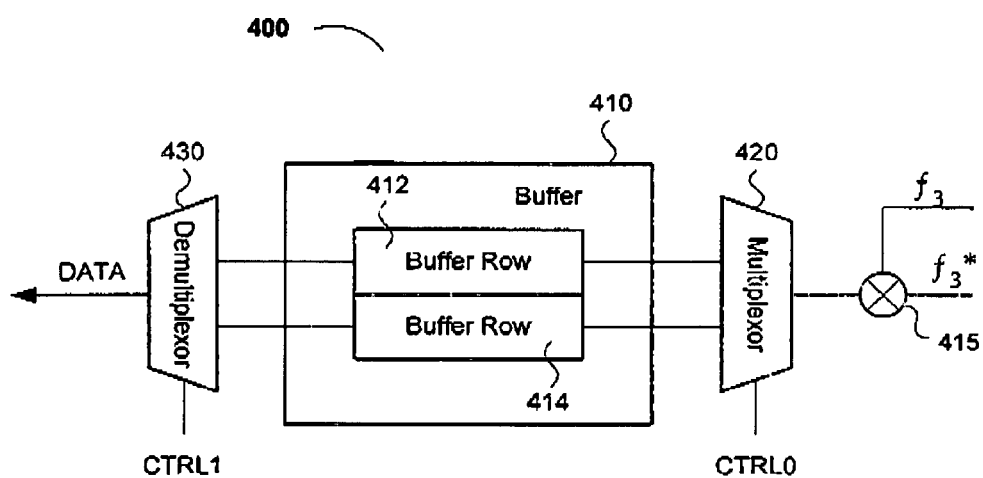
FIG. 5 is a diagram showing an embodiment of the present decoder.

In a further embodiment, the present time diversity coding architecture comprises decoder circuitry. FIG. 5 shows exemplary decoder circuit 400 suitable for the present invention, comprising buffer 410, multiplier 415, demultiplexer 420 and multiplexer 430. Buffer 410 is essentially the same as buffer 310 of FIG. 4, but comprises fewer buffer rows (generally the same number of rows as the number of data copies or the time diversity coding factor). Generally, buffer 410 comprises buffer rows 412 and 414, each configured to receive a copy of the communicated data, generally in response to a demultiplexer control signal CTRL0. Thus, the decoder buffer may comprise a sufficient number of rows to store each of the copies of the communicated data. Multiplier 415, demultiplexer 420 and multiplexer 430 are generally conventional, and the operation of the exemplary decoder circuit 400 is as follows.

As described above, when the circuit employs digital reliability factors, data stream $f_3$ may be multiplied by the corresponding and/or associated reliability factors $f_3*$ by multiplier 415, and demultiplexer 420 shifts the reliability factor-associated data into one of rows 412 or 414 in response to demultiplexer control signal CTRL0. Like multiplexer control signal 325 of FIG. 4, demultiplexer control signal CTRL0 is generally configured to change state every T/2 msec, and may be generated by a one-bit incrementer that in turn, changes state in response to an appropriately configured counter receiving a real-time clock signal.

Multiplexer 430 is configured to output a most reliable copy DATA of the filtered communicated data, generally in response to a multiplexer control signal CTRL1. The multiplexer control signal may be generated by a comparator that receives the reliability factors associated with the time diversity coded data, but decoded similarly to the reliability factor-associated data as described above. Alternatively, multiplexer control signal CTRL1 may simply comprise the associated reliability factors themselves, with an appropriate timing delay (to any extent desired and/or necessary). In the example of FIG. 5, control signals CTRL0 and CTRL1 are each a single bit signal.

Exemplary Methods

The present invention relates to a method of increasing the reliability of communicated data, comprising the steps of (a) reading a plurality of copies of the communicated data over a predetermined period of time; (b) associating each copy of the communicated data with a reliability factor, the reliability factor having a value that is a function of a (time-dependent) data communications parameter; and (c) recovering a reliable value for the communicated data (e.g., from the copies of the communicated data and the associated reliability factors). The present method may further comprise creating the plurality of copies of the communicated data. The present time diversity coding scheme (e.g., reading the copies of the data over the period of the time-dependent parameter variations) enables one to assign an analog value for the reliability factors based on the actual value of the time-dependent parameter, or set a threshold value for the time-dependent parameter, relative to which the data may be considered more reliable or less reliable, in a digital sense. In either case, the invention increases the reliability of the communicated data.

In various embodiments of the present method, and as may be explained in greater detail above, the step of creating copies of communicated data may comprise writing the communicated data into a plurality of memory blocks (where the memory blocks may comprise a buffer or buffer row as described above); the step of reading may comprise reading the copies of the communicated data sequentially from a first one of the plurality of memory blocks, then a second one of the plurality of memory blocks; and/or the step of associating may comprise (i) assigning an analog value for an associated reliability factor based on or corresponding to the actual value of the time-dependent parameter at the time that the data is processed and/or communicated, or (ii) determining whether the time-dependent parameter is above or below a predetermined value, generally as described above (for example, by assigning (1) a first value to the reliability factor when the time-dependent parameter is above the predetermined value and (2) a second value to the reliability factor when the time-dependent parameter is below the predetermined value). Furthermore, the step of associating may further comprise (i) aligning each of the reliability factors with the associated user data, or (ii) concurrently associating the reliability factor with the communicated data.

In further embodiments, the step of recovering and/or generating a reliable value for the communicated data may comprise calculating a data-reliability product from the copies of the communicated data and their associated reliability factors, comparing the data-reliability product to a predetermined value, and outputting a reliable value for the data depending on the outcome of the comparing step. For example, if the data-reliability product is greater than the predetermined value, a first digital data value (e.g., 1) is output. On the other hand, if the data-reliability product is less than the predetermined value, a second digital data value (e.g., 0 or −1) is output. Generally, the data-reliability product is calculated on samples taken from a given data stream (as described above). Alternatively, in the digital case, the data-reliability product may be calculated bit by bit for given data sequence. In one implementation, the data-reliability product is calculated by multiplying the copies of the data bit or sample by their associated reliability factors and summing the products, and a reliable data value for the data bit is generated by comparing the value of the data-reliability product to zero (0) and outputting a one (1) if the data-reliability product is greater than zero and a negative one (−1) if the data-reliability product is less than zero.

In a digital embodiment, the recovering step may comprise comparing (i) a first reliability factor associated with a first data bit of a first copy of the communicated data with (ii) a second reliability factor associated with a corresponding first data bit of a second copy of the communicated data. More generally, however, the recovering step comprises comparing (i) each of the reliability factors associated with each data bit (or group of data bits) of the first copy of the communicated data with (ii) each of the reliability factors associated with each corresponding data bit (or group of data bits) of a second copy of the communicated data. Also, reliable data may be recovered by accepting and/or selecting one copy of the data bit (e.g., from the first copy and second copies) associated with the same or higher reliability factor.

Exemplary Software

Although the description herein tends to focus on methods and hardware (e.g., architectures, systems and/or circuits), the present invention also includes a computer program and/or software, implementable and/or executable in a general purpose computer or workstation equipped with a conventional digital signal processor, configured to perform one or more steps of the method and/or one or more operations of the hardware. Thus, a further aspect of the invention relates to software that implements the above method and/or algorithm. For example, the invention may further relate to a computer program, computer-readable medium or waveform containing a set of instructions which, when executed by an appropriate signal processing device, is configured to perform the above-described method and/or algorithm.

For example, the computer-readable medium may comprise any medium that can be read by a signal processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional network cable, a conventional optical data transmission cable, or even air or a vacuum (e.g., outer space) for wireless signal transmissions.

The waveform and/or code are generally digital, and are generally configured for processing by a conventional digital data processor (e.g., a microprocessor, microcontroller, or logic circuit such as a programmable gate array, programmable logic circuit/device or application-specific [integrated] circuit).

Exemplary Transceivers, Systems and Networks

A further aspect of the invention relates to a transceiver, comprising the present circuit and/or architecture, and a receiver communicatively coupled to the circuit, configured to receive serial data communicated to the receiver from a network. The receiver and/or transceiver may further comprise a conventional clock recovery circuit, configured to recover a clock signal from the serial data, and/or other circuitry conventionally associated with a data receiver.

The transceiver may further comprise a transmitter communicatively coupled to the circuit, configured to transmit serial data externally to a network. The transceiver may further comprise a phase locked loop (PLL) configured to provide a reference clock signal to the transmitter and the receiver (and/or to other circuits, such as the permuter, depermuter and decoder described above). In further embodiments, the transceiver may be configured to convert serial data from the network to parallel data for a device, and/or convert parallel data from the device to serial data for the network. The transceiver may be embodied on a single integrated circuit.

The present invention also concerns a system for transferring data on or across a network, comprising the present transceiver, and at least one external transmitter for transmitting serial data (e.g., the communicated data) to the receiver portion of the present transceiver. Thus, when the system comprises a single-chip transceiver, the system may further comprise an internal transmitter (i.e., on the same chip as the present circuit) communicatively coupled to (i.e., physically and/or electronically associated with) the present circuit, configured to transmit serial data to the network. The system may also further comprise at least one receiver port external to the receiver and/or transceiver, communicatively coupled to the internal transmitter for receiving the serial data transmitted therefrom.

A further aspect of the invention concerns a network, comprising a plurality of the present systems, communicatively coupled to each other; and a plurality of storage or communications devices, each of the storage or communications devices being communicatively coupled to one of the systems. The network may be any kind of known network using a cyclostationary channel, such as a storage network (e.g., RAID array), powerline network, or home network. Furthermore, the network may include any known storage or communications device, but preferably, at least a plurality of the coupled devices comprise powerline communications and/or storage devices, such as a personal computer, telephone, television, media recorder and/or player (such as a DVD player, a CD player), etc.

CONCLUSION/SUMMARY

Thus, the present invention provides a circuit, architecture, method, algorithm, software and system for improving or increasing the reliability of data communications using time diversity coding. This technique is particularly useful in cyclostationary channels, where certain data communications parameters (such as noise and/or power parameters) have time-dependent or periodic variations in value. By associating a reliability factor with each copy of the communicated data received during a time period when a channel parameter has a time-dependant parameter that may affect data reliability, intelligent time diversity coding provides an increased probability that the communicated data is accurate and/or reliable.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit for increasing a reliability of communicated data received from a cyclostationary data communication channel, the circuit comprising:
   an association circuit configured to (i) rearrange the communicated data; and (ii) associate a first reliability factor with a first copy of the communicated data and a second reliability factor with a second copy of the communicated data, wherein the first reliability factor is different from the second reliability factor and has a value that is a predetermined function of a known characteristic of the cyclostationary data communication channel at a time that the communicated data passed through the cyclostationary data communication channel, and wherein the communicated data has a period that substantially equals an integer divisor of a period of the cyclostationary data communication channel wherein the integer divisor is greater than one; and
   a decoder configured to recover a reliable value for the communicated data, wherein any reliable value recovered by the decoder is based on at least the first copy, the second copy, the first reliability factor, and the second reliability factor, and wherein the decoder is configured to wait until the first copy and the second copy are received before decoding either the first copy or the second copy.

2. The circuit of claim 1, wherein the known characteristic of the cyclostationary data communication channel comprises a time-dependent characteristic.

3. The circuit of claim 2, wherein the communicated data is communicated at a predetermined rate and each of the first copy and the second copy of the communicated data is communicated sequentially in a time period defined by the predetermined rate.

4. The circuit of claim 2, wherein the time-dependent characteristic comprises a noise parameter, a power parameter, and/or an attenuation parameter of the cyclostationary data communication channel.

5. The circuit of claim 1, wherein the association circuit is further configured to (i) align the first reliability factor with the first copy of communicated data, and (ii) align the second reliability factor with the second copy of the communicated data.

6. The circuit of claim 1, wherein the decoder further comprises a buffer having a sufficient number of rows to store each of the first copy of the communicated data and the second copy of the communicated data.

7. The circuit of claim 6, wherein the decoder further comprises a multiplexer configured to select one of the rows to store each of the first copy of the communicated data and the second copy of the communicated data.

8. The circuit of claim 1, wherein the decoder is further configured to (i) generate a decision metric by operating mathematically on the first copy, the second copy, the first reliability factor, and the second reliability factor and to (ii) recover the reliable value from the decision metric.

9. The circuit of claim 1, wherein the decoder is configured to recover the reliable value by:
   multiplying the first copy by the first reliability factor to obtain a first product;
   multiplying the second copy by the second reliability factor to obtain a second product; and
   summing the first product and the second product.

10. The circuit of claim 1, wherein the communicated data is permuted prior to entering the cyclostationary data communication channel.

11. The circuit of claim 1, wherein the association circuit rearranges the communicated data by depermuting the communicated data.

12. The circuit of claim 1, wherein the integer divisor of the period of the cyclostationary data communication channel is two where the first copy of the communicated data is passed in a half-period of the cyclostationary data communication channel.

13. The circuit of claim 1, wherein the first copy of the communicated data and the second copy of the communicated data are passed through the cyclostationary data communication channel during successive half periods of the cyclostationary data communication channel.

14. A method of increasing a reliability of communicated data, the method comprising:
   reading a first copy and a second copy of the communicated data from a cyclostationary data communication channel over a predetermined period of time, wherein the first copy and the second copy are consecutively transmitted over the cyclostationary data communication channel;
   rearranging the communicated data;
   associating the first copy of the communicated data with a first reliability factor and the second copy of the communicated data with a second reliability factor, wherein the first reliability factor is different from the second reliability factor and has a value that is a predetermined function of a known characteristic of the cyclostationary data communication channel at a time that the communicated data passed through the cyclostationary data communication channel, and wherein the communicated data has a period that substantially equals an integer divisor of a period of the cyclostationary data communication channel wherein the integer divisor is greater than one; and
   recovering a reliable value for the communicated data, wherein any reliable value recovered is based on at least the first copy, the second copy, the first reliability factor, and the second reliability factor.

15. The method of claim 14, wherein the known characteristic of the cyclostationary data communication channel comprises a time-dependent characteristic.

16. The method of claim 15, wherein the communicated data is communicated at a predetermined rate and each of the first copy and the second copy of the communicated data is communicated sequentially in a time period defined by the predetermined rate.

17. The method of claim 15, wherein the time-dependent characteristic comprises a noise parameter, a power parameter, and/or an attenuation parameter.

18. The method of claim 14, further comprising aligning the first reliability factor with the first copy of the communicated data and aligning the second reliability factor with the second copy of the communicated data.

19. The method of claim 14, wherein recovering the reliable value comprises calculating a data-reliability product from the first copy, the second copy, the first reliability factor, and the second reliability factor, comparing the data-reliability product to a predetermined value, and outputting the reliable value depending on whether the data-reliability product is greater than or less than the predetermined value.

20. The method of claim 19, comprising outputting a first digital data value as the reliable value when the data-reliability product is greater than the predetermined value, and outputting a second digital data value as the reliable value when the data-reliability product is less than the predetermined value.

21. The method of claim 14, further comprising taking a sample of each of the first copy and the second copy of the communicated data as the first copy and second copy of the communicated data pass through the cyclostationary data communication channel.

22. The method of claim 21, wherein recovering the reliable value comprises:
   multiplying the ample of the first copy of the communicated data by the first reliability factor to obtain a first product;
   multiplying the sample of the second copy of the communicated data by the second reliability factor to obtain a second product; and
   summing the first product and the second product.

23. A non-transitory computer-readable medium storing computer-executable instructions that, when executed by at least one computer processor, causes a computer system to perform a method of increasing a reliability of communicated data, the method comprising:
   reading a first copy and a second copy of the communicated data from a cyclostationary data communication channel over a predetermined period of time, wherein the first copy and the second copy are consecutively transmitted over the cyclostationary data communication channel;
   rearranging the communicated data;
   associating the first copy of communicated data with a first reliability factor and the second copy of the communicated data with a second reliability factor, wherein the first reliability factor is different from the second reliability factor and has a value that is a predetermined function of a known characteristic of the cyclostationary data communication channel at a time that the communicated data passed through the channel, and wherein the communicated data has a period that substantially equals an integer divisor of a period of the cyclostationary data communication channel wherein the integer divisor is greater than one; and
   recovering a reliable value for the communicated data, wherein any reliable value recovered is based on at least the first copy, second copy, first reliability factor, and second reliability factor.

* * * * *